(12) United States Patent　　(10) Patent No.:　US 12,605,006 B2

Oliver　　(45) Date of Patent:　Apr. 21, 2026

(54) FASTENING DEVICE FOR GROUND PROTECTION MATS

(71) Applicant: Ground-Guards Ltd, Leeds (GB)

(72) Inventor: Marcus Oliver, Wetherby (GB)

(73) Assignee: Ground-Guards Ltd, Leeds (GB)

( * ) Notice: Subject to any disclaimer, the term of this patent is extended or adjusted under 35 U.S.C. 154(b) by 729 days.

(21) Appl. No.: 18/073,363

(22) Filed: Dec. 1, 2022

(65) Prior Publication Data

US 2024/0180348 A1　　Jun. 6, 2024

(30) Foreign Application Priority Data

Nov. 30, 2021　(GB) ..................................... 2117287

(51) Int. Cl.
　　*A47G 27/04*　　(2006.01)
　　*A47G 27/02*　　(2006.01)
　　*F16B 21/02*　　(2006.01)
(52) U.S. Cl.
　　CPC ..... *A47G 27/0418* (2013.01); *A47G 27/0206* (2013.01); *F16B 21/02* (2013.01)
(58) Field of Classification Search
　　None
　　See application file for complete search history.

(56) References Cited

U.S. PATENT DOCUMENTS

| | | | |
|---|---|---|---|
| 4,308,646 A | * | 1/1982 | Schenk ................... F16B 21/04 |
| | | | 411/554 |
| 4,442,571 A | * | 4/1984 | Davis ....................... F16B 5/10 |
| | | | 24/DIG. 59 |

| | | | |
|---|---|---|---|
| 6,343,709 B1 | * | 2/2002 | DeForrest ............ B65D 43/022 |
| | | | 220/327 |
| 6,722,831 B2 | * | 4/2004 | Rogers .................... F16B 21/02 |
| | | | 411/553 |
| 6,896,460 B2 | * | 5/2005 | Enomoto ............ F16B 19/1081 |
| | | | 411/41 |
| 7,748,939 B2 | * | 7/2010 | Bulow ...................... F16B 5/10 |
| | | | 411/553 |
| 9,068,584 B2 | * | 6/2015 | McDowell ............ E02D 31/004 |
| 9,098,252 B2 | * | 8/2015 | Sauer ................... H05K 7/1429 |
| 9,506,255 B1 | * | 11/2016 | Jones ...................... E01C 9/086 |
| 10,266,994 B2 | * | 4/2019 | McDowell ............ F16B 5/0642 |
| 12,337,586 B2 | * | 6/2025 | Forbes ....................... B27J 1/00 |
| 2017/0241084 A1 | * | 8/2017 | Else ....................... E01C 11/02 |
| 2019/0257093 A1 | | 8/2019 | Polk, Jr. et al. |
| 2022/0325481 A1 | * | 10/2022 | Thelin .................... F16B 21/02 |

FOREIGN PATENT DOCUMENTS

| | | |
|---|---|---|
| GB | 2527676 A | 12/2015 |
| GB | 2547048 A | 8/2017 |
| WO | 2015193657 A1 | 12/2015 |

* cited by examiner

*Primary Examiner* — Matthew R McMahon

(74) *Attorney, Agent, or Firm* — KIRTON McCONKIE; Evan R. Witt

(57)　　　　　　ABSTRACT

A fastening device to releasably interconnect ground protection mats or panels. The fastening device comprises a first male part and a second female part. Each male and female part comprise a respective helical rib having features configured to interlock so as to provide frictional resistance to axial separation so as to interconnect ground protection mats to form a unitary ground covering system.

21 Claims, 8 Drawing Sheets

FASTENING DEVICE FOR GROUND PROTECTION MATS

FIELD OF INVENTION

The present invention relates to a fastening device to releasably interconnect ground protection mats forming a panelled ground protection system.

BACKGROUND ART

Modular ground protection flooring is used frequently to provide temporary protection for grass and turfed areas such as sport stadiums as well as to provide temporary access to sites with poor ground conditions including construction, energy and utility installation sites. These modular systems create rigid floor surfaces that provide walkways, roads, parking areas and other types of flooring to support the passage of people and vehicles and allow storage and mounting of equipment. Example modular flooring systems are described in WO 2011/130012; WO 2010/138604; U.S. Pat. No. 5,364,204; US 2004/0005430 and GB 2261003.

Some existing plastic ground protection mats are typically hollow honeycomb constructions with examples described in U.S. Pat. Nos. 5,653,551; 6,511,257; 6,649,110; 6,695,527; and US2012/0266549. The honeycomb construction may allow air and light to penetrate to the underlying grass whilst also providing the required rigidity.

Connection and interlocking of the mats to form a unitary structure is important so that they are not displaced during use. Example interlocking mat assemblies are described in US 2004/005430, US 2012/0266549, US 2010/0290863, and U.S. Pat. No. 6,722,831. However, existing ground protection apparatus and in particular mat interconnectors typically require relatively precise alignment during coupling and are generally limited for use on flat ground. That is, these existing systems become very difficult to connect when the mats are laid on uneven ground and/or the connector and/or mats change slightly by expansion or contraction due to temperature change. Additionally, existing systems are typically very difficult to interconnect in conditions where the mat interconnectors become heavily coated in mud or other ground debris. In these situations, mating flanges or threads often become blocked. Additionally, when the panels are rigidly connected, undesirably large stress and strain forces are placed on the connectors which are then susceptible to damage or failure.

Furthermore, existing systems are typically associated with large numbers of ground protection mats which typically require large numbers of connectors. In remote locations and particularly in muddy ground conditions and/or where the weather is inclement, it is not always possible to use power tools to install and remove the mats. A larger number of mat connectors presents a significant task for installation staff having to manually rotate conventional connection bolts to provide complete mat coupling. Accordingly, what is required is a fastening arrangement and ground protection apparatus that addresses these problems.

SUMMARY OF THE INVENTION

It is an objective of the present concept to provide a fastening device for the releasable interconnection of ground protection mats or panels that is convenient to operate in all manner of environments specifically including muddy, sandy and other ground conditions that may be laden with lose ground material. It is a specific objective to provide connection apparatus and a ground protection system that utilises a fastening device that may be operated conveniently by manual tools via a simple rotational action of the coupler via a minimum number or rotations. It is a specific objective to minimise the time taken for interconnection and dismantling of the ground protection system via a coupler mechanism that is quick and convenient to operate.

It is a further specific objective to provide such a fastening device that provides a reliable and robust connection of adjacent ground protection mats and is resistant to localised movement. It is a further specific objective to provide a fastening device to forcibly draw together misaligned adjacent mats and to provide a fastening device that does not require precise co-locating of mats. It is a yet further specific objective to provide a fastening device having a locking mechanism to retain adjacent mats in interconnected and partially overlapped contact with one another whilst enabling the mats to move so as to accommodate expansion and contraction due to temperature changes or lateral displacement due to other forces. It is a yet further objective to provide a ground protection system providing such features.

The objectives are achieved via a fastening device and connection apparatus and system having a male part and a female part that are mateable together via a rotation of at least the male part, with the connection mechanism being releasably locked together via a biased lock that is resistant to decoupling of the male and female parts. The present fastening device, apparatus and system utilises first and second helical ribs provided at the male and female parts having a minimum axial length. Such a configuration is advantageous to minimise a rotation needed to advance and fully couple the male part within the female part to achieve a fully locked and interconnected coupled joint. This is achieved via cooperating helical ribs at the male and female parts having an axial length that correlates to a pitch of at least the first helical rib on the male part and optionally the second helical rib on the female part. That is, the present coupler comprising the respective helical ribs for interconnection comprises an axial length that is in a range 70 to 150% of the pitch of the first and/or second helical ribs.

Reference within this specification to 'pitch' encompasses a distance from a first crest to a second crest of a thread that follows a helical pathway along a shaft of the male part (i.e., a bolt or screw) when viewed from the side and/or at an axial cross section of the shaft that includes the helical thread. The distance between neighbouring or adjacent crests in the axial direction includes the distance between a mid-point of each neighbouring crest (axially closest or adjacent crest) that includes an apex, a mid-plateau region or other mid-point of what may be regarded a crest or peak of the helical thread. Similarly, the term 'pitch' may equally be taken as the distance between the root or trough of the thread with the pitch being the distance from a first root to a next neighbouring or adjacent root when viewed from the side or at the same axial cross section of the shaft upon which the thread extends.

According to the present concept, the axial length of the helical rib on the male part and the female part extends over a range 255 to 540° (as defined between the end points of the thread i.e., start and finish points in the axial direction). Optionally, the helical rib extends over a single helical turn of around 360° to start and stop approximately at the same position in a circumferential direction on the shaft (with the start and finish axial ends of the helical rib being aligned or approximately aligned in a circumferential direction).

Within the specification, the reference to the 'axial length' of the helical rib includes a helical rib and optionally none, some, part of or all nodes, projections or flanges that project radially, axially, and/or circumferentially at axial end regions of the helical rib. Accordingly, the axial length of the helical rib may not include any node projections at the rib axial ends. Optionally, the axial ends of the helical rib may be defined as the region immediately starting with an enlarged node projection. Accordingly, the rib is defined as having a generally uniform axial thickness and radial width. However, for the purposes of the calculation of the length of the helical thread, the helical thread may include node projections of enlarged axial thickness and radial width relative to a majority of the length of the helical rib that is enlarged with such node projections positioned at a region along the length of the helical rib i.e., not at the rib axial ends and/or at mid-axial length regions.

The present fastening device is suitable for the releasable interconnection of ground protection mats via a face-to-face contact of opposed flanges formed at the mats. Optionally, the flanges extend laterally outward from the mat lengthwise and widthwise sides. Optionally, a separate coupler could be used to couple the mats instead of overlapping flanges provided at each mat. Such a coupler may comprise a generally planar body so as to extend between adjacent neighbouring mats and effectively bridge the neighbouring mats as a bridging unit. The coupler may comprise the same connection mechanism, features and function as described referring to the ground protection mats.

Advantageously, the present fastening device is suitable to couple neighbouring and adjacent mats laid on uneven or lose ground and that may be misaligned due to such ground undulations. The present device is specifically beneficial to draw-together the mats via a simple minimum rotational action of a coupler body. The adjacent mats once drawn-together are then adapted to be releasably locked in their fastened configuration via a releasable lock mechanism. The minimised rotational action of the coupler body is achieved via a minimised axial length of the inter engaging helical ribs provided at the male and female parts. Additionally, the helical ribs are further configured via their respective axial length and radial thickness to provide an interconnection mechanism that is resistant to clogging, blocking and fouling by mud, dirt, dust, sand and other loose ground material. The present connection device and system therefore provides a reliable interconnection mechanism suitable for use in a variety of different ground conditions and being operable using hand/manual tools.

Additionally, the present device via the locking mechanism provides that the mats may not be decoupled without unlocking the lock mechanism whilst allowing the mats some degree of movement or 'play' in both the horizontal/lateral plane and also the vertical plane (perpendicular to the main body of the mats). Such non-rigidly interlocked mats are therefore adapted to provide an interconnected or tessellated ground protection system having a non-rigid interconnected structure capable of following local undulations in the ground and to withstand loading forces and temperature variations that would otherwise impart stress and strain to the fastening devices.

According to one aspect of the present concept there is provided a fastening device to releasably interconnect ground protection mats or panels. According to a first aspect of the present concept there is provided a fastening device to releasably interconnect ground protection mats comprising: a first part of a connection mechanism having a male part; a second part of the connection mechanism having a female part with a bore to receive the male part and configured to connect at least two neighbouring ground protection mats side-by-side by rotation of the male part relative to the female part; the male part comprises a first helical rib projecting radially outward from a shaft and the female part comprises a second helical rib projecting radially inward at the bore configured to receive the shaft, the ribs configured to abut one another, an axial length of the first helical rib being in the range 70% to 150% of a pitch of the first helical rib; an axial and radial lock having a first element at the rib of the male part and a second element at the rib of the female part, the first and second elements configured to engage one another by the rotation of male part relative to the female part; and a bias lock actuator to impose an axial force to the first element to force the first element in engaged contact against the second element and to provide frictional resistance to further rotation of the male part relative to the female part.

Optionally, an axial length of the first helical rib excludes the first element at the rib of the first part if present at an axial end of the rib. Preferably, the first helical rib extends over a range 255 to 540°; 300 to 420° or 320 to 40°. Such an arrangement is advantageous to provide complete interconnection and locking of the ground engaging mats via a fastening device that is time efficient to install by requiring approximately a single 360° rotation to achieve full connection. The single turn helical ribs are also beneficial to provide convenient and reliable coupling of the mats in debris laden environments such as muddy, dusty, stony and sandy ground. The ribs of the present device are robust and suitably enlarged relative to conventional screw threads typically found on conventional bolts that are otherwise difficult if not impossible to operate in muddy, sandy and similar environments.

Preferably, the first and second elements comprise a combination of a node projecting from one of the ribs and a gap in the alternate rib, the gap extending in the circumferential direction of the rib. Optionally, the first element is provided at the rib of the male part and the second element is provided at the rib of the female part. Optionally, the first node is provided at a mid-length region of the rib and the gap is provided at a mid-length region of the alternate rib.

Optionally, the device comprises a second node provided at an axial end of the rib. The axial locking of the fastening device and the engaging mats is accordingly achieved via a simple rotation of the first part relative to the second part. The locking mechanism is provided at the helical rib to provide a reliable and robust cooperative means of both attaching the mats and locking the mats in position.

Preferably, the first and second nodes are separated by a distance in a range 160 to 200° or 170 to 190° in a circumferential direction. This is beneficial to stabilise the first part within the second part as the axially separated dual locking mechanism is provided at opposite sides of the male part (bolt) being separated by an angular separation of approximately 180°.

Preferably, the second node comprises a length in a circumferential direction being greater than a length of the first node and/or the gap. Preferably, the first node and/or the gap has a length in the circumferential direction being 40 to 60% of the length of the second node in a circumferential direction. The first node is accordingly configured to pass the gap in the rib of the second part such that the locking action is engaged only at complete or near complete full engagement of the first part and the second part. This arrangement also provides that the locking action is achieved via a single rotation of the first part relative to the second part and does not require an additional actuation of the locking mechanism relative to the rotation of the first part at the second part. The engagement and coupling of the mats in addition to the locking of the mats is accordingly provided by a single operation i.e. rotation of the male bolt into the barrel that forms the second (female) part.

Preferably, the node is defined in-part relative to the rib by a trailing face that extends axially between a lateral surface of the rib and a crest or plateau of the node, wherein an angle by which the trailing face extends relative to a longitudinal axis of the shaft is in a range 25 to 65°, 30 to 60° or 35 to 55°. The stated angle of the trailing face may also be provided at a leading face of the first node and/or a trailing and/or leading face of a second node at the male rib. This inclined or sloping face at the recited angle represents a balance/compromise between achieving a secure lock (by frictional engagement) and also enabling the male and female parts to be separated via a single rotation in a counter clockwise direction relative to the clockwise direction of rotation for coupling. The inclined faces are accordingly configured to slide past the respective side faces that define the gap within the female rib and/or the end face provided at the terminal end of the female rib.

Optionally, the bias lock actuator comprises an O-ring positioned between a head of the first part that is radially enlarged relative to the shaft and an end face of the second part provided at or towards one axial end of the bore. Optionally, the bias lock actuator may comprise a cone washer, a resiliently deformable flange provided at the male part and/or the female part. Optionally, the bias lock actuator comprises a flexible flange at the first part and projecting radially outward relative to the shaft, the flange capable of flexing axially in contact with a region of the second part. Optionally, the bias lock actuator is provided by a resiliently flexible characteristic of at least one of the ribs at the first and second parts wherein at least one of the ribs is configured to flex axially as the first and second parts are mated. Preferably, the bias lock actuator is provided by a connection by which the node is connected or extends from the rib such that the connection is capable of resiliently flexing axially as the first and second parts are mated. Optionally, the bias lock actuator comprises any one or a combination of: a flexible washer; a spring; a resiliently flexible member; provided and acting between a region of the first part and a region of the second part to provide the axial force to the first part. Preferably, the bias lock actuator is configured to impose an axial force to the first element in an axial direction to separate the first part form the second part.

Preferably, the first part comprises a head provided at and being radially enlarged relative to the shaft, the head comprising a recess and a raised island at a centre of the recess. Preferably, an inner face that in-part defines a sidewall of the recess is sloping relative to a plane of the head that extends perpendicular to a longitudinal axis of the shaft. This prevents or minimises dirt, mud, sand or other debris becoming lodged within the recess at the head of the first part that would otherwise inhibit engagement by a rotational drive tool. Preferably, a perimeter of the head is bevelled or rounded. This avoids the head providing an obstruction that may be susceptible to impact by people, vehicles or objects passing over the mats. Preferably, an end face of the shaft is generally planar or is not pointed or domed. The generally planar end face of the shaft is useful to help expel any dirt or debris present within the bore of the female part.

According to a further aspect of the present concept there is provided ground protection apparatus comprising: a plurality of ground protection mats and a coupler connectable in partial overlapping configuration with the mats, at least some of the mats having a set of holes; and a plurality of fastening devices as described and claimed herein wherein the coupler and/or the fastening devices are at least partially mountable within the holes to releasably interconnect the ground protection mats.

Preferably, the coupler comprises or is formed with a plurality of the second parts and the apparatus comprises a plurality of the first parts engageable with the second parts at the coupler According to a further aspect of the present concept there is provided ground protection apparatus comprising: a plurality of ground protection mats provided with respective flanges formed at each of the mats and extending along lengthwise and/or widthwise edges of the mats, the flanges of the mats positionable and connectable in overlapping configuration with neighbouring mats; and a plurality of fastening devices as described and claimed herein at least partially mountable within the mats to releasably interconnect the ground protection mats.

According to a further aspect of the present concept there is provided a fastening device to releasably interconnect ground protection mats comprising: a first part of a connection mechanism having a male part; a second part of the connection mechanism having a female part with a bore to receive the male part and configured to connect at least two neighbouring ground protection mats side-by-side by rotation of the male part relative to the female part; the male part comprises a first helical rib projecting radially outward from a shaft and the female part comprises a second helical rib projecting radially inward at the bore configured to receive the shaft, the ribs configured to abut one another; an axial and radial lock having a first element at the rib of the male part and a second element at the rib of the female part, the first and second elements configured to engage one another by the rotation of male part relative to the female part; and a bias lock actuator to impose an axial force to the first element to force the first element in engaged contact against the second element and to provide frictional resistance to further rotation of the male part relative to the female part.

The second (female) part may be formed integrally with the ground protection mat or may be formed as a separate component. Optionally, the second (female) part is formed non-integrally with and at least partially mountable at each ground protection mat.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
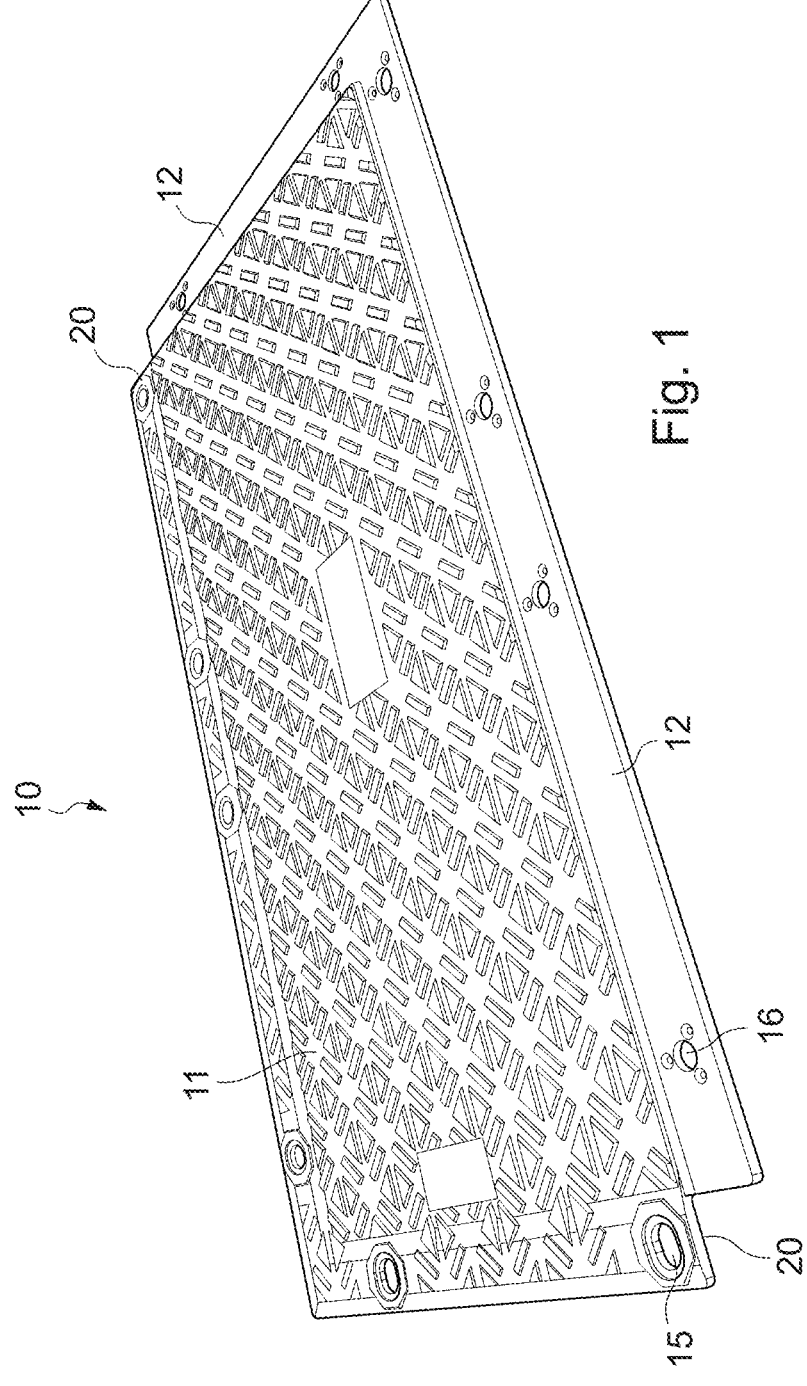
FIG. 1 is a perspective view of a ground protection mat.
Figure 2:
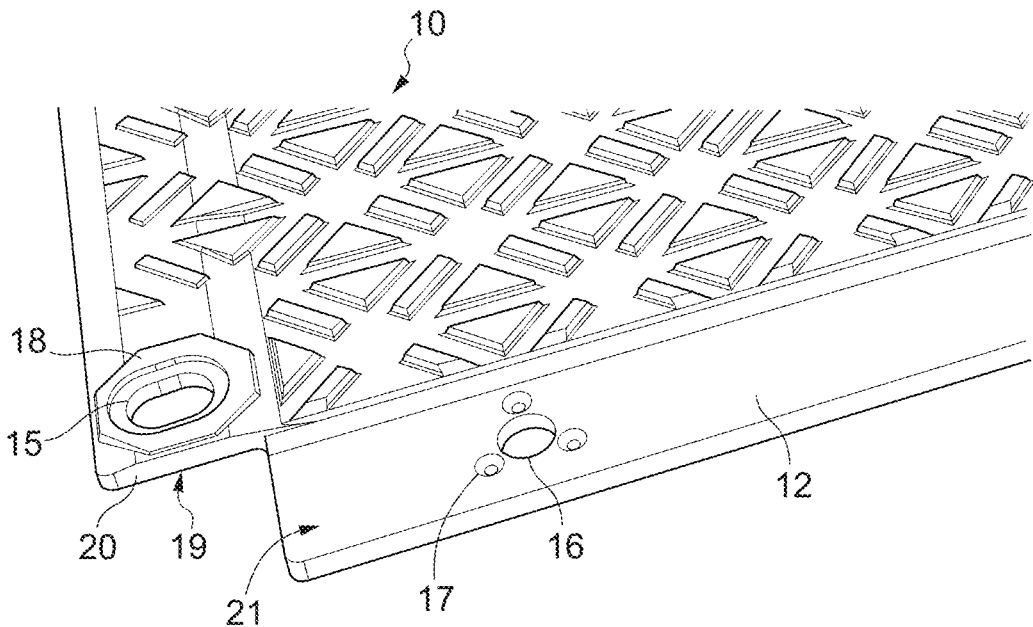
FIG. 2 is a magnified view of overlapping flanges and holes of the ground protection mat of FIG. 1.

Referring to FIGS. 1 and 2, a ground protection system and apparatus comprises a plurality of mats 10 capable of being interconnected in partial overlapping configuration so as to provide a tessellated interconnected and unitary base positionable on the ground. The present system and apparatus is suitable for placement on a range of different surfaces but is ideally suited for placement on loose ground material such as ground with dirt, sand, gravel or on surface with organic matter such as vegetation and grass. Each mat 10 comprises a generally planar main face 11 intended to be upward facing with the mat 10 positioned on the ground. According to the preferred embodiment, each lengthwise and widthwise edge of each mat 10 comprises a lengthwise and widthwise extending flange 12 that projects laterally outward from a main body (that forms the majority of mat 10). Each flange 12 comprises a plurality of holes 15, 16 to receive a fastening device as described herein to interconnect the mat 10. A first pair of lengthwise and widthwise flanges project laterally outward from a lower region of mat 10 and a corresponding pair of widthwise and lengthwise flanges 20 project laterally outward from an upper region of mat 10. The separation distance between flanges 20 and 12 is configured such that the mats 10 may be positioned side-by-side with flanges 20 of a first mat 10 overlapping onto the corresponding flanges 12 of a neighbouring mat. In particular and referring to FIG. 2, flanges 12 comprise upper (upward facing) surface 21 configured for positioning in face-to-face contact with corresponding lower (downward facing) face 19 of flange 20.

Mat 10 comprises a plurality of holes 15 formed at each flange 20. Each hole 15 comprises an annular surface 18 representing a collar surrounding hole 15. Flanges 12 similarly comprise a plurality of holes 16. A plurality of satellite bores 17 (three bores) are positioned around each hole 16 and are configured to receive attachment screws used to attach part of the mat fastening device in position as described herein.

Figure 3:
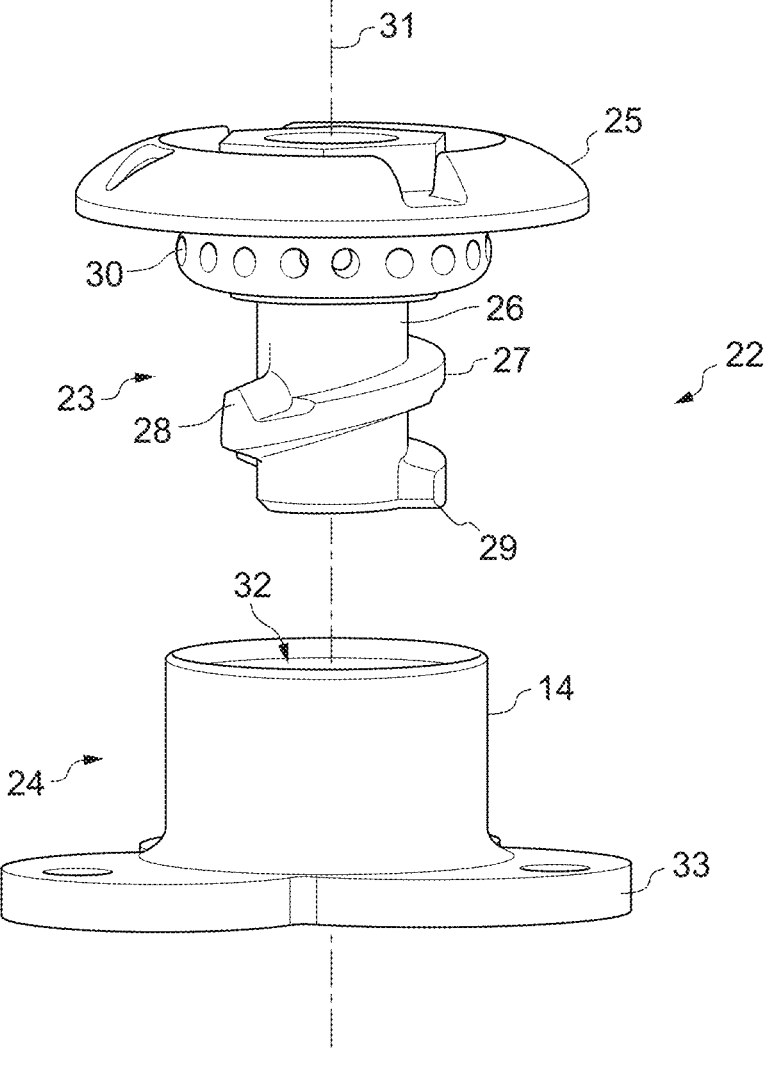
FIG. 3 is a perspective view of a fastening device to interconnect ground protection mats of FIGS. 1 and 2 having a first (male) part and a second (female) part according to a specific implementation of the present invention.

Referring to FIG. 3, holes 15 and 16 are configured to receive a respective fastening device indicated generally by reference 22 having a first part 23 and a second part 24. First part 23 may be regarded a male part and comprises an elongate shaft 26 centred on longitudinal axis 31 and a radially enlarged head 25 projecting radially outward at one end of shaft 26. A helical rib 27 projects radially outward from and extends around shaft 26 lengthwise in a direction of axis 31 from a region immediately in-board of head 25 towards a terminal distal end of shaft 26.

Second part 24 may be considered a female part and comprises a generally cylindrical barrel 14 defining an internal bore 32. Three base lobes (alternatively feet) 33 project radially outward from one end of barrel 14 representing mounting feet or lugs to mate into corresponding recesses (58 referring to FIG. 9) provided at an underside region of flanges 12. As described and illustrated in FIG. 9, first (male) part 23 may be inserted within hole 15 whilst second (female) part 24 is inserted within hole 16 such that as the male and female parts 23, 24 are mated together a corresponding coupling is provided to releasably interconnect neighbouring mats 10 in the partial overlapping side-by-side arrangement.

Figures 4, 5:
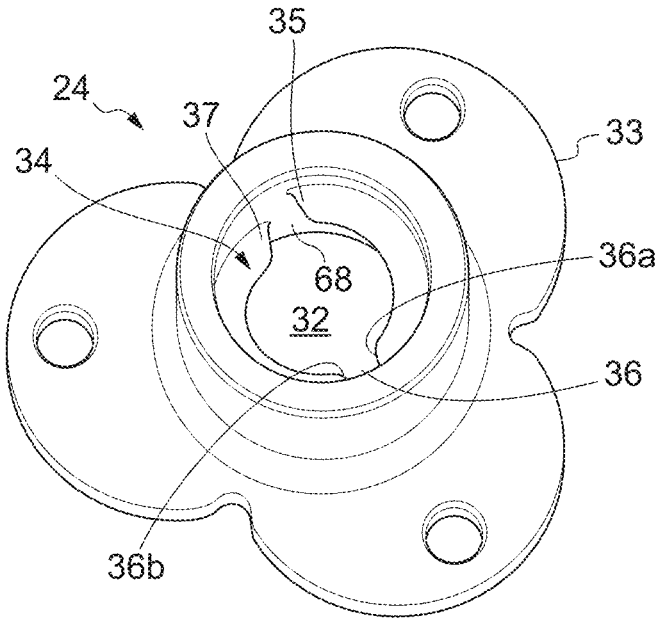
FIG. 4 is a perspective view of a second part of the fastening device of FIG. 3 having a central bore.
FIG. 5 is a side view of a first part of the fastening device of FIG. 3 in the form off a bolt having a head and shaft.

Referring to FIG. 4, second part 24 also comprises a helical rib illustrated generally by reference 34 that projects radially inward from bore 32 and in particular a cylindrical bore surface 68. Helical rib 34 comprises a first axial end 35 and a second opposite axial end 37 with ends 35, 37 separated axially by a distance approximately equal to an axial length of bore 32. That is, helical rib (alternatively a thread) 34 extends over all or a majority of the axial length of bore 32. A gap 36 is provided at a mid-axial length position of helical rib 34. Gap 36 is positioned at an equal separation distance from rib first end 35 and rib second end 37.

Figure 6:
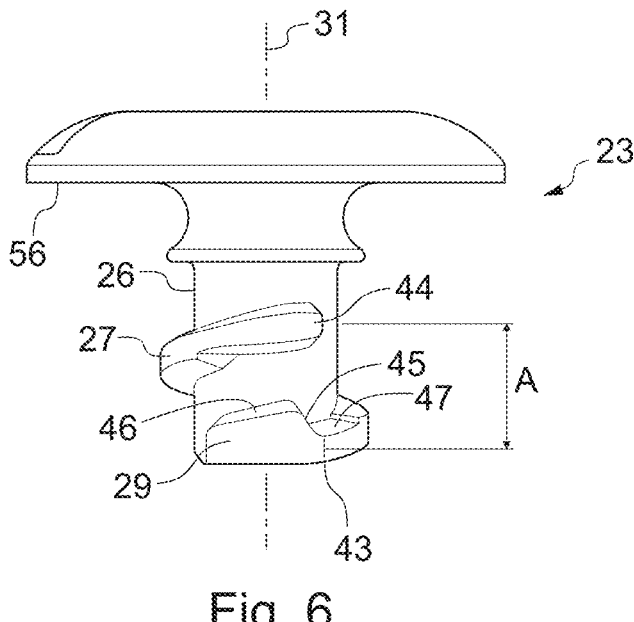
FIG. 6 is a further side view of the first part of the connection mechanism of FIG. 5.

Referring to FIG. 6, rib 27 projecting radially outward at shaft 26 of the first part 23 comprises a first rib end 44 and a second rib end 43. An axial separation distance A of rib first end 44 and second end 43 is approximately equal to a pitch of the helical rib. In particular, helical rib 27 extends over an angular distance of approximately 360° between ends 44 and 43. The axial distance A accordingly represents one full helical turn of rib 27 extending between ends 44 and 43. The axial dimensions and length A of rib 27 is also approximately equal to the corresponding axial length of helical rib 34 provided at bore 32. Referring to FIGS. 5 and 6, first part 23 comprises a first node 28 and a second node 29 that project axially at regions of rib 27. Each node 28, 29 may be considered a projection, hump, nodule or bulge extending both in the axial and circumferential directions. First node 28 is provided at a mid-axial length region of rib 27 at a corresponding position of gap 36 formed within rib 34. Second node 29 is positioned at the second terminal end 43 of rib 27. Second node 29 comprises a greater circumferential length relative to the mid-length first node 28. Referring to FIGS. 5 and 6, first node 28 is defined, in part, by an inclined or sloping trailing face 39, a plateau face 40 and a corresponding declined or sloping leading face 41. Accordingly, second node 29 might be described as tooth shaped or frusto-conical when viewed from the side. The distance in the circumferential direction (relative to axis 31) between faces 41 and 39 defines a circumferential length of node 28 that accordingly comprises a circumferential length that decreases from rib 27 towards a plateau face. A length of node 28 in the circumferential direction is approximately equal to a corresponding circumferential length of gap 36. Second node 29 is similarly defined in part by a trailing or sloping face 45 and a plateau face 46. Plateau face 46 and 40 are angled at a corresponding angle of the helical rib 27 such that second node 29 comprises a thickness in the axial direction that decreases in its circumferential length. The circumferential length of second node 29 is greater than gap 36 and greater than the maximum circumferential length between faces 39 and 41 of the first node 28. The first node 28 is positioned at an angular separation distance of around 180° from second node 29.

First part 23 comprises an O-ring positioned immediately adjacent head 25 and at a position axially between shaft 26 and head 25. O-ring 30 is seated on an annular concave lip 13 that projects axially from an underside surface 56 of head 25. O-ring 30 is dimensioned so as to project radially beyond lip 13 and shaft 26.

Figure 7:
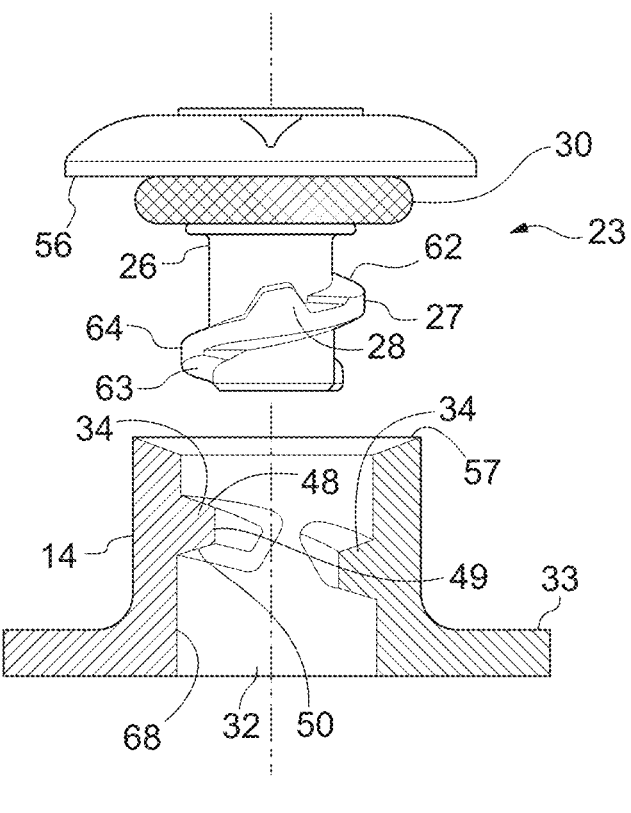
FIG. 7 is a partial cross sectional side view of the fastening device of FIG. 3 illustrating the second part of the connection mechanism having an internal bore.

Referring to FIG. 7, helical rib 27 is defined, in part by an upper face 62, a corresponding and opposite lower face 63 and a side face 64 extending between faces 62, 63. Similarly, helical rib 34 at second part 24 is defined, in part, by an upper face 48, a corresponding lower face 50 and a side face 49 extending between faces 48 and 50. Each node 28, 29 projects axially upward from rib face 62 over the respective circumferential distance of each node 28, 29. First part 23 and in particular shaft 26 is capable of being inserted into bore 32 such that rib 27 engages rib 34. As first part 23 is rotated about axis 31 upper face 62 of rib 27 engages in close touching contact the corresponding lower face 50 of rib 34 according to a conventional screw thread coupling. The continued rotation of first part 23 relative to second part 24, causes second node 29 to travel past gap 36 due to the larger circumferential length of node 29 relative to gap 36. With continued rotation of the first part 23, eventually node 28 is rotated to a corresponding position of gap 36. Due to the approximately equal circumferential length of node 28 and gap 36, node 28 is forced axially upward into gap 36. At the corresponding time, node 29 and in particular plateau surface 46 clears rib end 37 and is similarly displaced axially. In the axially displaced positions, node faces 41 and 39 abut corresponding side faces 36a, 36b of gap 36 so as to frictionally hold and releasably lock first part 23 to second part 24. Similarly, face 45 of second node 29 abuts against an end face of rib end 37. With this face abutment, first part 23 is releasably held at second part 24.

The axial biasing of first part 23 relative to second part 24 is provided by O-ring 30. In particular, and referring to FIG. 7, O-ring 30 is configured to seat against an annular end face 57 of barrel 14 with the shaft 26 mated fully into bore 32. Full insertion of shaft 26 into bore 32 requires compression of the O-ring 30 with the compression force acting in the axial direction to separate first part 23 from second part 24. This axial return force provides the corresponding axial force to drive the axial displacement of node 28 into gap 36 and also node 29 beyond rib end 37.

Figure 8:
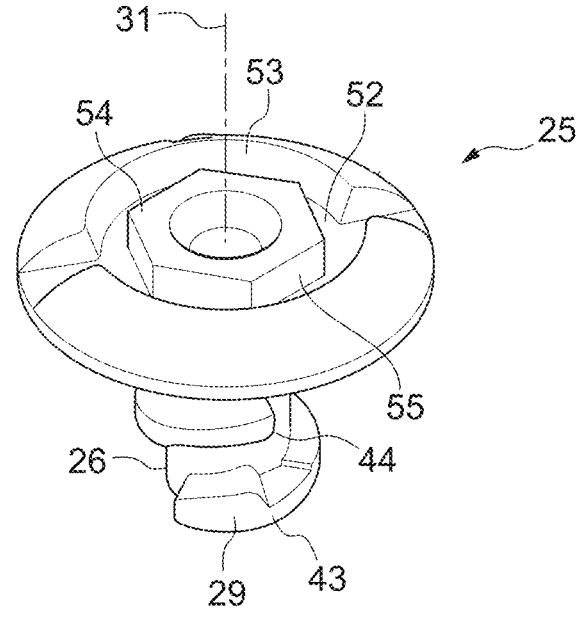
FIG. 8 is a further perspective view of the first part of the connection mechanism of FIG. 6.

Referring to FIG. 8, head 25 comprises a recess 52 indented into an upward facing surface. Recess 52 is defined, in part, by a sloping sidewall face 53. A central island 54 projects axially from a base of recess 52 with island 54 defined by sidewall faces 55 and comprising a generally hexagonal shape profile. A separation distance between faces 55 and 53 is sufficient to allow insertion of a tool such as a cylindrical socket having an internal cross sectional shape profile corresponding to that of island 54. As such, rotation of the socket and engagement of island 54 (via faces 55) provides rotational drive of the first part 23 into second part 24 via the corresponding mated contacts between ribs 27 and 34. Slopping face 53 is inclined relative to axis 31. This prevents mud or other ground debris becoming lodged in the recess 52 that would otherwise hinder engagement of the first part 23 by a rotational drive tool (not shown).

Figure 9:
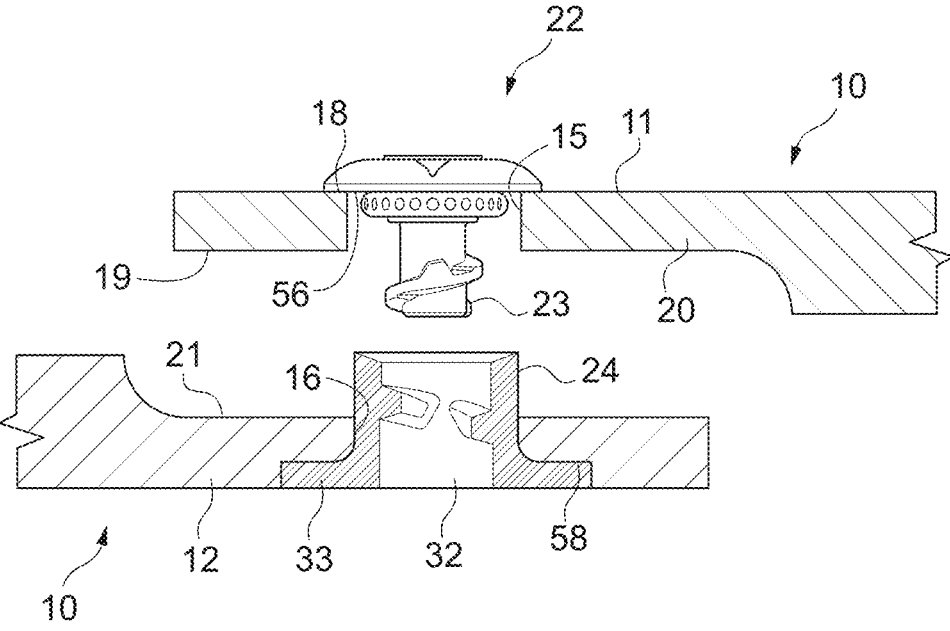
FIG. 9 is a partial cross sectional side view through a first and second ground protection mat immediately prior to interconnection together via the fastening device of FIG. 1.

Referring to FIG. 9, with the second part 24 mounted within hole 16 and feet 33 fully located within recess 58 at a first mat 10, a second mat 10 may then be located onto the first mat 10 via mating of the flange faces 19, 21. First part 23 is then inserted into hole 15 such that head underside surface 56 abuts against the annular surface 18 at the mat upward facing face 11. First part 23 may then be rotated via engagement of the tool (not shown) with island 54 so as to inter-engage the respective helical ribs 27, 34 as described. Complete mating of the first and second parts 23, 24 is achieved when node 28 is displaced axially to sit into gap 36 and second node 29 clears rib end 37 so as to provide a double lock mechanism being frictionally and mechanically resistant to decoupling of first part 23 relative to second part 24. Accordingly, the two mats 10 are held in overlapping interconnected position via the frictional contact of the respective ribs 27, 34 and the resiliently biased contact of the nodes 28, 29 with those respective parts of rib 34.

Figure 10:
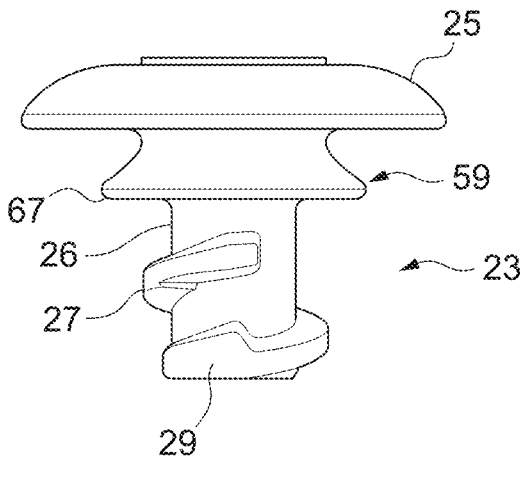
FIG. 10 is a side view of further embodiment of a first part for the connection mechanism of the type described herein.

FIG. 10 illustrates a further embodiment of the present fastening device in which the first part 23 comprises the same features and function as described referring to FIGS. 3 to 9 with the exception of the O-ring 30 and lip 13. A radially enlarged flange 59 extends radially from shaft 26 in place of the O-ring 30 and comprises a decreasing axial thickness towards an annular perimeter 67. Accordingly, flange 59 is configured to deform axially as the first part 23 is mated into the barrel 14. In particular, flange 67 is configured to abut regions of barrel 14 and deform axially so as to provide the corresponding return bias force (as provided by O-ring 30 according to the first embodiment).

Figure 11:
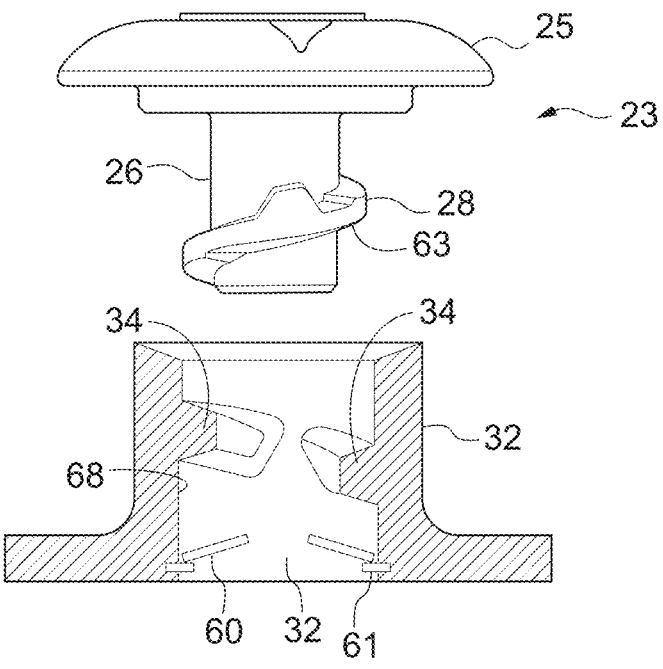
FIG. 11 is a partial cross sectional side view of a further embodiment of the fastening device as described herein.

A further embodiment is described referring to FIG. 11 in which the first part 23 comprises the same features and function as described referring to FIGS. 3 to 9 also with the exception of the O-ring 30. According to the further embodiment, the bias force is provided by a conical washer 60 housed within bore 32 and seated on an annular shelf 61 that projects radially inward from cylindrical surface 68 of bore 32. Accordingly, as first part 23 is advanced into bore 32, conical washer 60 abuts the terminal end/tip of first part 23 and provides the corresponding axial bias force that drives axial displacement of node 28 into gap 36.

Figure 12:
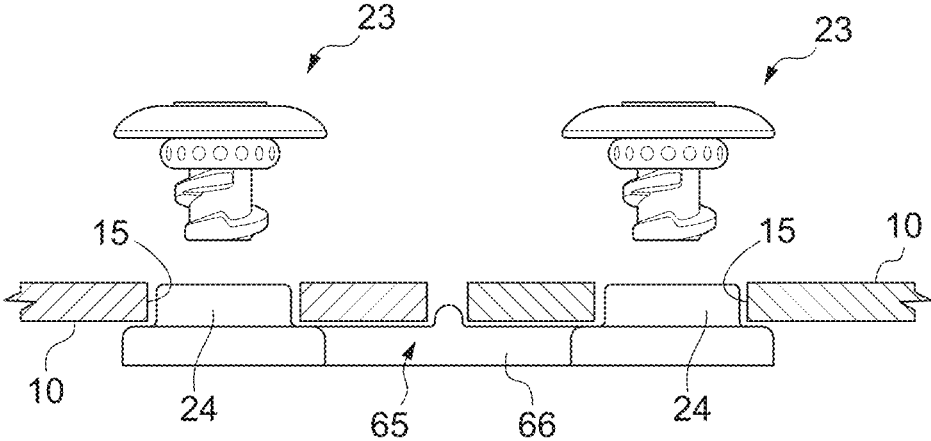
FIG. 12 is a partial cross sectional side view through a ground protection system having mats and couplers according to a further embodiment.

FIG. 12 illustrates a yet further embodiment in which two adjacent mats 10 may be interconnected via a generally planar coupler 65. According to the further embodiment, mats 10 may not comprise the respective flanges 12, 20 so as to be capable of being interconnected without overlapping parts. Coupler 65 accordingly provides a bridging unit that extends between the respective mats 10. In particular, coupler 65 comprises the respective second parts 24 interconnected by a bridge 66 to form a unitary bridging unit. Each second part 24 to receive respectively a first part 23 comprises the same features and function as described referring to FIGS. 3 to 9 including in particular helical ribs 34 extending within respective bores 32. Accordingly, first parts 23 may be mated respectively into corresponding holes 15 at mats 10 and engage into the coupler 65 via the respective second (female) parts 24.

The invention claimed is:

1. A fastening device to releasably interconnect ground protection mats comprising:
   a first part of a connection mechanism having a male part;
   a second part of the connection mechanism having a female part with a bore to receive the male part and configured to connect at least two neighbouring ground protection mats side-by-side by rotation of the male part relative to the female part;
   the male part comprises a first helical rib projecting radially outward from a shaft and the female part comprises a second helical rib projecting radially inward at the bore configured to receive the shaft, the ribs configured to abut one another, an axial length of the first helical rib being in the range 70% to 150% of a pitch of the first helical rib;
   an axial and radial lock having a first element at the rib of the male part and a second element at the rib of the female part, the first and second elements configured to engage one another by the rotation of male part relative to the female part; and a bias lock actuator to impose an axial force to the first element to force the first element in engaged contact against the second element and to provide frictional resistance to further rotation of the male part relative to the female part;

wherein the first and second elements comprise a combination of a node projecting from one of the ribs and a gap in the alternate rib, the gap extending in the circumferential direction of the rib.

2. The device as claimed in claim 1 wherein the axial length of the first helical rib excludes the first element at the rib of the first part if present at an axial end of the rib.

3. The device as claimed in claim 1 wherein the first helical rib extends over an angular distance in the range 255 to 540°.

4. The device as claimed in claim 1 wherein the first element is provided at the rib of the male part and the second element is provided at the rib of the female part.

5. The device as claimed in claim 1 wherein the node is a first node and is provided at a mid-length region of the one of the ribs and the gap is provided at a mid-length region of the alternate rib.

6. The device as claimed in claim 5 comprising a second node provided at an axial end of the one of the ribs.

7. The device as claimed in claim 6 wherein the first and second nodes are separated by a distance in a range 160 to 200° in a circumferential direction.

8. The device as claimed in claim 6 wherein the second node comprises a length in a circumferential direction being greater than a length of the first node and/or the gap.

9. The device as claimed in claim 8 wherein the first node and/or the gap has a length in the circumferential direction being 40 to 60% of the length of the second node in a circumferential direction.

10. The device as claimed in claim 1 wherein the node is defined in-part relative to the rib by a trailing face that extends axially between a lateral surface of the rib and a crest or plateau of the node, wherein an angle by which the trailing face extends relative to a longitudinal axis of the shaft is in a range 20 to 65°.

11. The device as claimed in claim 1 wherein the bias lock actuator comprises an O-ring positioned between a head of the first part that is radially enlarged relative to the shaft and an end face of the second part provided at or towards one axial end of the bore.

12. The device as claimed in claim 1 wherein the bias lock actuator comprises a flexible flange at the first part and projecting radially outward relative to the shaft, the flange capable of flexing axially in contact with a region of the second part.

13. The device as claimed in claim 1 wherein the bias lock actuator comprises any one or a combination of:

a flexible washer;

a spring; and a resiliently flexible member;

the bias lock actuator provided and acting between a region of the first part and a region of the second part to provide the axial force to the first part.

14. The device as claimed in claim 1 wherein the first part comprises a head provided at and being radially enlarged relative to the shaft, the head comprising a recess and a raised island at a centre of the recess.

15. The device as claimed in claim 14 wherein an inner face that in-part defines a sidewall of the recess is sloping relative to a plane of the head that extends perpendicular to a longitudinal axis of the shaft.

16. The device as claimed in claim 14 wherein a perimeter of the head is bevelled or rounded.

17. The device as claimed in claim 1 wherein an end face of the shaft is generally planar or is not pointed or domed.

18. The device as claimed in claim 1 wherein the bias lock actuator is configured to impose an axial force to the first element in an axial direction to separate the first part form the second part.

19. Ground protection apparatus comprising:

a plurality of ground protection mats and a coupler connectable in partial overlapping configuration with the mats, at least some of the mats having a set of holes; and a plurality of fastening devices as claimed in claim 1 wherein the coupler and/or the fastening devices are at least partially mountable within the holes to releasably interconnect the ground protection mats.

20. The apparatus as claimed in claim 19 wherein the coupler comprises or is formed with a plurality of the second parts and the apparatus comprises a plurality of the first parts engageable with the second parts at the coupler.

21. Ground protection apparatus comprising:

a plurality of ground protection mats provided with respective flanges formed at each of the mats and extending along lengthwise and/or widthwise edges of the mats, the flanges of the mats positionable and connectable in overlapping configuration with neighbouring mats; and a plurality of fastening devices as claimed in claim 1 at least partially mountable within the mats to releasably interconnect the ground protection mats.

* * * * *